May 1, 1923.  
D. M. ROBERTS  
HARROW AND SCARIFIER  
Filed Oct. 24, 1921

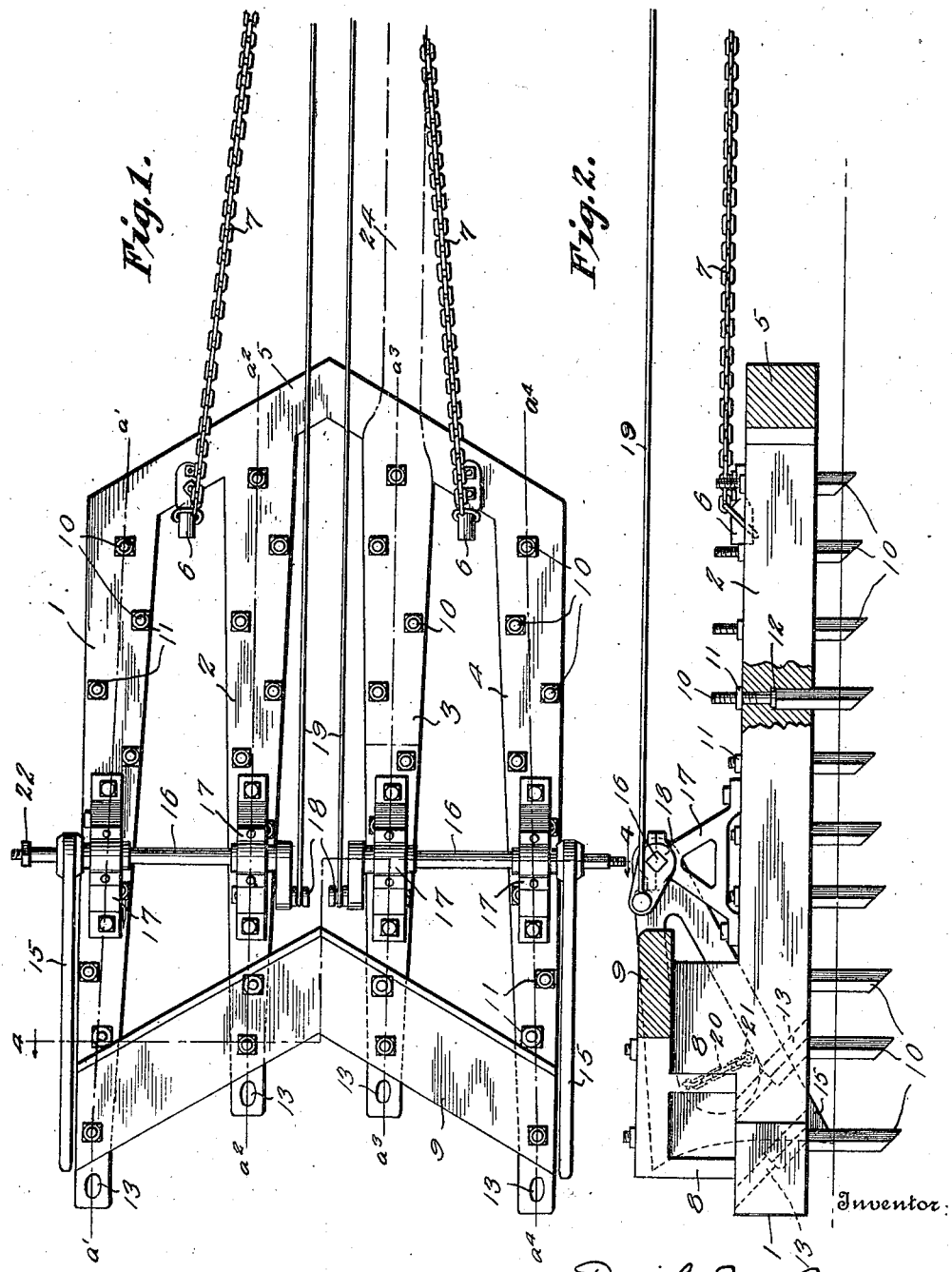

Inventor:
Daniel M. Roberts,
By Byrnes, Townsend
& Brickenstein,
Attorneys.

Patented May 1, 1923.

1,453,998

UNITED STATES PATENT OFFICE.

DANIEL M. ROBERTS, OF HOMESTEAD, FLORIDA.

HARROW AND SCARIFIER.

Application filed October 24, 1921. Serial No. 509,934.

*To all whom it may concern:*

Be it known that I, DANIEL M. ROBERTS, a citizen of the United States, residing at Homestead, in the county of Dade and State of Florida, have invented certain new and useful Improvements in Harrows and Scarifiers, of which the following is a specification.

My invention relates to harrows and particularly to heavy harrows or scarifiers of the type used to prepare for cultivation partially cleared land or hard and resistant ground, such for example as coraline rock or hardpan, or to break up old road surfaces or pavements.

An object of my invention is to provide a heavy harrow which will be of simple and rugged construction, which will be efficient in operation and which can be handled by a single operative. A further object of my invention is to provide a harrow which will cut or tear a plurality of trenches through the ground and which will be particularly free from clogging by the material thrown up by the teeth. More particularly, an object of my invention is to provide a harrow having a plurality of sets of teeth and in which the forward teeth of each set operate to open a shallow and relatively wide trench in the ground while the rear teeth deepen the trench opened by the front teeth but on narrower lines. A further object of my invention is to provide a heavy harrow comprising a plurality of substantially parallel bars and in which the clearance between the bars increases towards the rear of the harrow to allow ample clearance for the material torn up. Still another object is to provide a harrow of the type last stated with a weight carrying platform so located that it will not decrease the clearance space provided for material dislodged by the harrow. A further object is to provide a harrow which may be readily raised to elevate the teeth above the ground level and which when so elevated may be fitted with removable wheels for transporting the harrow along the roads.

One embodiment of my invention which will accomplish these and other objects is illustrated in the accompanying drawings in which—

Fig. 1 is a plan view of the harrow;

Fig. 2 is a vertical section taken along the center line of the harrow;

Figure 3:
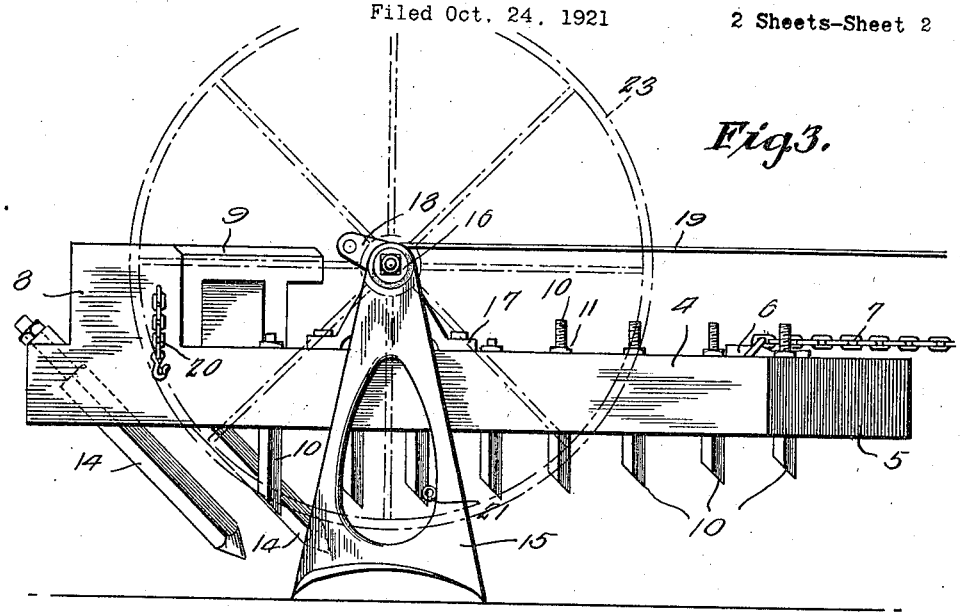
Fig. 3 is a side elevation of the harrow and showing the harrow elevated on the lifting stands and provided with heavy duty teeth.
Figure 4:
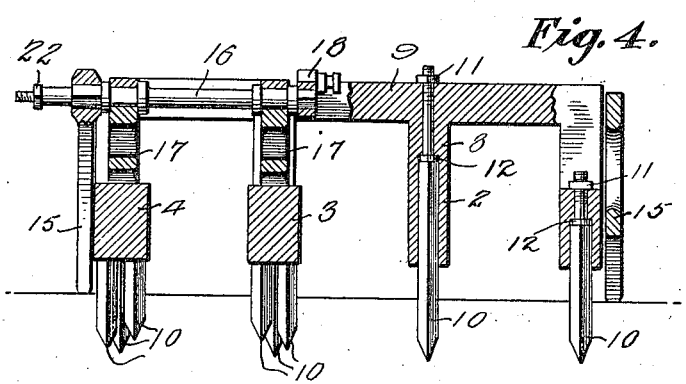
Fig. 4 is a vertical section taken on line 4—4 of Fig. 1 and looking in the direction of the arrows.
Figure 5:
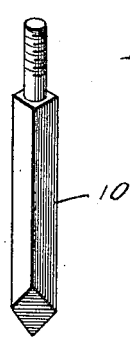
Figs. 5 and 6 are detail views of the regular and the heavy duty teeth, respectively.
Figure 6:
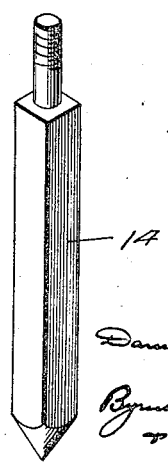

The harrow frame comprises a plurality of bars and in the embodiment illustrated in the drawings four bars are shown, being designated by the numerals 1, 2, 3 and 4. The bars are connected at their forward ends by the nose 5 which is preferably V-shaped that it may throw off loose material lying in the path of the harrow. The bars and the nose of the harrow are of metal and of relative massive construction. As here shown these parts are rectangular in cross-section though other cross-sections may be employed providing a sufficient mass of metal is employed to furnish the desired weight to the frame. The nose 5 is provided with lugs 6, 6 to which draft chains 7, 7 may be attached and the lugs may be integral with the nose or attached thereto.

The bars 1, 2, 3 and 4 narrow in width towards the rear of the harrow to provide a gradually increasing clearance between the bars. As illustrated the taper on bars 2 and 3 is taken up on both sides of the bars and the taper on bars 1 and 4 is taken up on the inside only leaving the outer sides of these bars parallel. With this construction the center lines of the bars $a^1$—$a^1$, $a^2$—$a^2$, etc. are not exactly parallel but they are substantially parallel to each other and to the center line of the harrow. If desired the taper of the outer bars could be so arranged that absolute parallelism resulted, but some variation from such an arrangement is permissible as will be more fully pointed out hereinafter.

Near the rear of each bar it is provided with a rugged post 8 and the tops of posts 8 are connected by a rear frame member 9 which serves to space and to strengthen the ends of the bars and which also serves as a weight carrying platform in case extra weight is required to embed the rear teeth to the desired depth in the ground. To secure a platform of large capacity the rear frame member 9 is preferably V-shaped, as shown.

Each bar is provided with a set of harrow teeth and the teeth 10, 10, of each set gradually increase in length from the front to the rear of the set. The front tooth and the rear tooth of each set are located on the center line of the bar which may also be considered as the center line of the set of teeth. The intermediate teeth of the set are staggered on opposite sides of the center line of the set, the amount of the offset from said line gradually decreasing from the front to the rear of the set. As the center lines of the bars and sets of teeth are substantially parallel to the center line or direction of travel of the harrow it follows that the teeth will cut or tear a plurality of trenches through the ground. As stated above absolute parallelism is not essential but substantial parallelism is necessary, the permissible variation being established by the condition that with the teeth of a set arranged as described no one of the rear teeth will enter the ground outside of the trench determined by the front three teeth of the set. The individual teeth 10 have a lower portion which is square in cross section and which extends some distance into a correspondingly shaped opening in the harrow bar and the upper ends of the teeth are round and provided with threads to receive nuts 11 which clamp the teeth in place. Washers 12 are used at the upper end of the square section of the teeth to secure an adjustment of the tooth length to give the desired variation in tooth length along the set. The teeth 10, as shown, have diamond points and are arranged at right angles to the bars but any desired form of tooth may be used and the angle at which they enter the bars may be varied to suit different conditions. For heavy duty, as in cutting a very deep trench or in removing obstacles as roots or rocks which are firmly embedded in the ground it is frequently advantageous to use a longer and heavier tooth at the rear of each bar. To provide for this heavy duty a tooth opening 13 is made in the end of each bar and the opening passes through the bar at any desired angle, as 45 degrees. For heavy work some of the rear teeth 10 of the set are removed and a heavy pointed tooth 14 is inserted in each opening 13, as shown in Fig. 3.

At each side the harrow is provided with a lifting stand 15 and said stands are rigidly attached to shafts 16, 16 which are mounted in brackets 17 carried by the bars. The inner ends of shafts 16 are provided with cranks 18, 18 to which wires or cables 19, 19 are attached. The frame and stands are provided with flexible connections 20 and eyes 21, respectively for holding the stands in raised position when not in use. The outer ends of the shafts 16, 16 are extended beyond the stands to provide hubs 22, 22 for receiving removable wheels 23 which furnish a means for transporting the harrow from place to place. The wheels 23 obviously have a radius which is less than the length of the stands so that they may be slipped into place when the harrow is elevated upon the stands. A removable draft appliance, such as tongue 24 is used for drawing the harrow by clamping it to one of the center bars by means of the tooth nuts 11 or by additional clamping means. In the normal operation of the harrow the stands 15 drag upon the ground in the rear of the shafts 16. When the harrow is to be elevated to attach the wheels or when one or both sides of the harrow are to be elevated for removing rock or other obstructions which may be wedged between the bars the stands are thrown over by rotating shafts 16 through traction applied to the wires or cables 19. With the stands resting on the ground in front of the shafts 16 a forward movement of the harrow will rotate the shafts 16 upwardly about the ground engaging points of the stands, thereby carrying the harrow frame into elevated position.

As the harrow is intended for heavy work the entire frame is made of metal and the rear posts 8 and rear frame member 9 as well as the bars and nose are of substantial cross section. In the preferred construction the entire frame comprises a single integral member and is formed by casting but it is to be understood that the frame may be made up of separate parts which are united by bolting, riveting, welding or in any other desired manner.

Due to the gradually increasing length of the teeth of a set and to the arrangement of the teeth about the center line of the set a deep trench may be torn through the ground at the expenditure of a minimum amount of power. The forward teeth open a wide and shallow trench and the rear teeth progressively cut the trench deeper but on narrower lines and in material of substantially uniform density approximately the same amount of work is performed by each tooth. By tapering the bars a gradually increasing clearance is obtained for the material which is thrown up and which increases in quantity towards the rear of the harrow. By mounting the rear frame member on posts which extend upwardly from the bars the rear frame member will not "ride" upon the dirt and rock which is thrown up, hence deeper cutting is possible.

In actual use in breaking up coraline rock and in preparing partially cleared land for cultivation harrows embodying my invention have been found to be very efficient. The harrow may be operated by a light tractor and requires no operators in addition to the tractor driver. Besides tearing trenches through the soil, the sets of teeth crack or break the material which lies between the rows of teeth. With some formation this cracking of the soil between the bars on a single trip over the ground will result in a satisfactory preparation of the entire ground surface and in any case a second trip crossing the line of the first travel at an angle will effectively break up the entire surface.

It is to be understood that the embodiment herein described is but illustrative of my invention and that many changes may be made in the various parts, their relative proportion, size and shape and that such changes are contemplated within the scope of my invention.

I claim:—

1. A harrow comprising a plurality of bars which are narrower at the rear than at the front of the harrow, and a plurality of sets of harrow teeth, said bars and sets of harrow teeth being arranged substantially parallel to the center line of the harrow.

2. A harrow frame comprising a plurality of substantially parallel spaced bars and a rear frame member connected to and elevated above the rear portions of said bars.

3. A harrow frame comprising a plurality of substantially parallel bars, a rear frame member extending transversely of said bars, and means spacing said frame member from and connecting the same to said bars.

4. A harrow frame comprising a plurality of substantially parallel bars, means connecting the forward portions of said bars, an elevated rear frame member, and means connecting said frame member to said bars at the rear portions thereof.

5. A harrow frame comprising a plurality of bars arranged substantially parallel to the center line of the harrow, the forward ends of said bars, as viewed from the center line towards the sides of the harrow, being arranged at progressively greater distances from a transverse line through the front point of the frame, and means connecting the several bars, said means including a rear frame member spaced above and connected to the rear portions of said bars.

6. A harrow comprising a plurality of bars arranged substantially parallel to the center line of the harrow, the forward ends of the bars which are most distant from the center line of the harrow being to the rear of the forward ends of the bars which are nearer the center line of the harrow, and a plurality of sets of harrow teeth, the center line of each of said sets of teeth being substantially parallel to the center line of the harrow.

7. A harrow frame comprising a nose, a plurality of substantially parallel bars, a post at the rear of each bar and a rear frame member connected to said posts.

8. A harrow frame comprising a nose, a plurality of substantially parallel bars which narrow in width from the front to the rear, a V-shaped frame member connected to and elevated above said bars and serving as a weight carrying platform.

9. A harrow comprising a plurality of bars which narrow in width from the front to the rear of the harrow and a set of teeth for each of said bars, the teeth, as viewed from the front to the rear of each of said sets increasing in length and decreasing in the amount of offset from the center line of said set.

10. In a harrow a set of harrow teeth which progressively increase in length towards the rear of the harrow, said teeth being staggered on opposite sides of the center line of the set and the distance of the teeth from the center line progressively decreasing towards the rear of the set.

11. In a harrow, a set of harrow teeth comprising front teeth located at unequal distances from the longitudinal center line of the harrow and rear teeth which progressively increase in length, the distance of said rear teeth from the center line of the set of teeth progressively decreasing towards the rear of the set.

12. In a harrow a plurality of sets of teeth, said teeth increasing in length from the front to the rear of the harrow, each of said sets comprising a front tooth and a plurality of teeth arranged alternately on opposite sides of a line drawn through said front tooth and substantially parallel to the center line of the harrow, the distance of said teeth from said line progressively decreasing from the front to the rear of the set.

13. In a harrow, a plurality of substantially parallel bars, a set of teeth for each of said bars, a tooth receiving socket at the rear of each bar and teeth of substantially larger size than the teeth of said sets adapted to be removably mounted in said sockets.

In testimony whereof, I affix my signature.

DANIEL M. ROBERTS.